United States Patent

Spierings et al.

[11] Patent Number: 6,045,715
[45] Date of Patent: Apr. 4, 2000

[54] METHOD OF POST-ETCHING A MECHANICALLY TREATED SUBSTRATE

[75] Inventors: Gijsbertus A. C. M. Spierings; Poul K. Larsen; Jan B. P. H. Van der Putten; Johannes M. M. Busio; Frederik H. In 'T Veld; Lambertus Postma, all of Eindhoven, Netherlands

[73] Assignee: U.S. Philips Corporation, New York, N.Y.

[21] Appl. No.: 08/972,973

[22] Filed: Nov. 19, 1997

[30] Foreign Application Priority Data

Dec. 18, 1996 [EP] European Pat. Off. ............. 96203603

[51] Int. Cl.⁷ ....................................................... B44C 1/22
[52] U.S. Cl. ................................. 216/47; 216/44; 216/52
[58] Field of Search ................................. 216/17, 52, 44, 216/47, 97

[56] References Cited

U.S. PATENT DOCUMENTS

| | | | |
|---|---|---|---|
| 3,276,927 | 10/1966 | Medford | 216/17 |
| 3,693,302 | 9/1972 | Hakes | 451/31 |
| 4,106,859 | 8/1978 | Doriguzzi et al. | 428/1 |
| 5,347,712 | 9/1994 | Yasuda et al. | 29/852 |

FOREIGN PATENT DOCUMENTS 9629689  9/1996  WIPO ................................ G09F 9/35

*Primary Examiner*—Bruce Breneman
*Assistant Examiner*—Shamim Ahmed
*Attorney, Agent, or Firm*—F. Brice Faller

[57] ABSTRACT

Method of providing a pattern of apertures and/or cavities in, for example, a glass duct plate of a plasma-addressed liquid crystal display, in which first a mechanical treatment is performed (for example, by means of powder blasting) and then a wet-chemical etching treatment is performed to render the walls of the ducts microscopically less rough so that the optical disturbance is reduced and the glass becomes clearer again.

9 Claims, 6 Drawing Sheets

METHOD OF POST-ETCHING A MECHANICALLY TREATED SUBSTRATE

BACKGROUND OF THE INVENTION

The invention relates to a method of providing a pattern of apertures and/or cavities in a surface of a substrate, using a mechanical treatment.

Such a pattern is usually provided by means of powder blasting, grinding, lapping, sawing, drilling or another mechanical treatment.

If this method is used to provide cavities (ducts) in the (generally glass) channel plate of a PALC display (as known, for example, from WO 96/29689-A1, U.S. Pat. No. 5,626,772), the problem occurs that the treated part of the surface (the inner side of the channels) is microscopically rough after performing the mechanical treatment, so that the generated image does not have a sufficiently satisfactory contrast when the display incorporating the plate is being used.

OBJECTS AND SUMMARY OF THE INVENTION

It is an object of the invention to provide a method in which the walls of apertures and cavities obtained by a mechanical treatment can be processed in such a way that the surface is microscopically less rough after the treatment. To this end, after performing the mechanical treatment, a wet-chemical etching process is performed which renders the walls of the apertures and cavities microscopically less rough. More particularly, a mechanically treated channel plate can be rendered microscopically smooth enough by means of the wet-chemical etching process, so that it functions satisfactorily in a PALC (plasma-addressed liquid crystal) display.

The method may also be used to advantage for making cavities which constitute the cells of a cell plate or channels of a channel plate of a plasma display (PDP), for example, a high-resolution plasma display. The bottom and/or walls of the cells or channels are preferably microscopically smooth because it is then easier to provide them with a layer, for example, an electrode.

In accordance with an embodiment, the mechanical treatment is a powder blasting process using a powder blast-resistant mask. This process has the advantage that very fine patterns can be made.

In accordance with a further embodiment, the substrate is coated with an etch-resistant layer, for example, a chromium layer before it is mechanically treated. This has the advantage that the method can also be used if the part of the surface which is not mechanically treated must not come into contact with the etching liquid. The etch-resistant layer is provided before the mechanical treatment takes place, so that the walls of apertures or cavities that have been made will not be coated.

In accordance with a further embodiment, an etchant containing HF is used as a wet-chemical etchant. This may be, for example, pure HF, HF with acids such as $HNO_3$ and HF with $NH_4F$. It is possible to use a large number of etchant concentration variants. Another possible etchant is an etchant containing $HBF_4$. Also in this case, different concentrations are possible. An advantage of HF is that it etches rapidly. An advantage of $HBF_4$ is that there is less deposit. Another advantage is that it does not etch too rapidly so that the process can be better controlled. A combination of HF and $HBF_4$ may be used, for example, in a ratio of 1:10. Then, the advantages of both etchants can be combined. It is alternatively possible to use a concentrated lye solution as an etchant. A drawback is the slow etching rate. Dependent on the substrate to be etched (for example, a given type of glass), a given etchant in a given concentration is most suitable.

A specific embodiment of the method according to the invention comprises the steps of providing a chromium layer on a glass surface providing a blast-resistant mask on the chromium layer producing at least a jet of abrasive powder particles directing the jet onto the surface of the mask which is present on the surface to be treated performing a relative movement between the jet and the surface with the mask removing the blast-resistant mask wet-chemical etching with a glass-dissolving agent, with the chromium layer protecting the subjacent surface chromium-etching for the purpose of removing the chromium layer.

In a further specific embodiment of the method, a plate is completely immersed in an etching bath. This simplifies the method considerably. If it is not necessary to perform a strong etching treatment or if the untreated surface does not need to be smooth, then this immersion treatment in an etching bath may be used without any further measures. If more stringent requirements are imposed on the untreated side, then this side can be provided with an etch-resistant layer before the plate is immersed into the etching bath.

The substrate is preferably made of glass, and 2 to 200 micrometers is etched off the surface. Then the treated glass is completely clear again and gives a very good contrast. More particularly, 5 to 100 micrometers is etched off. Then the glass is clear enough for use in a display.

The invention is particularly practical for making a pattern of cavities, particularly parallel channels or cells. The invention is also applicable in practice for treating brittle materials such as ferrite, particularly when they are provided with a pattern by means of powder blasting. Ferrite is used, inter alia, in magnetic heads for video recorders. The invention is also applicable in practice for treating silicon or other semiconductor materials, particularly at small material dimensions, as is desired in electronic uses, where it is important that the material is microscopically smooth enough.

These and other aspects of the invention are apparent from and will be elucidated with reference to the embodiments described hereinafter. Similar components in the Figures have identical reference numerals.

DESCRIPTION OF THE PREFERRED EMBODIMENTS

Figure 1:
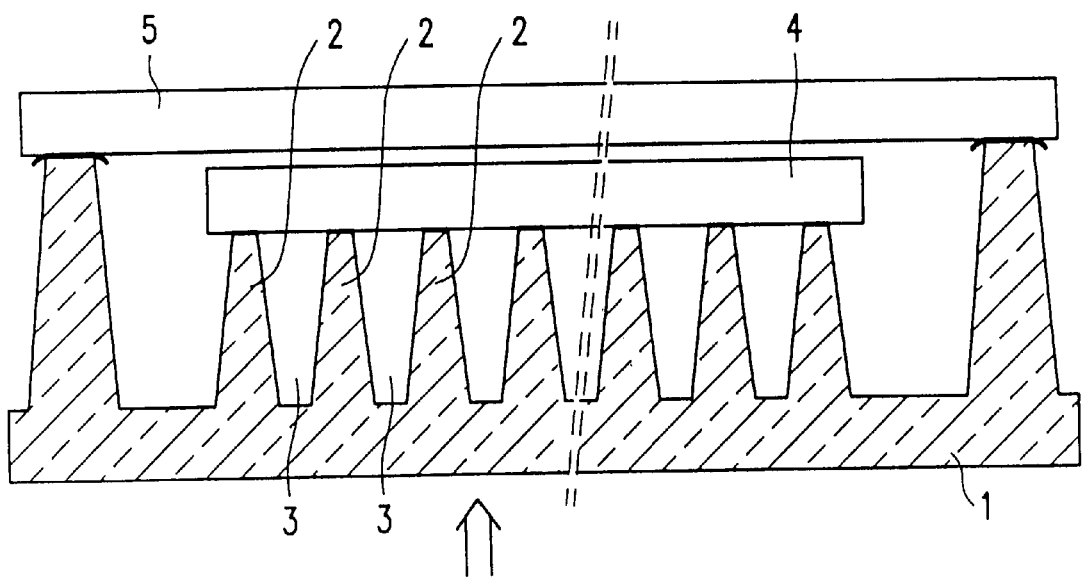
FIG. 1 is a diagrammatic cross-section of a plate system comprising a duct plate for a PALC display.

FIG. 1 is a diagrammatic cross-section of a plate system for an embodiment of a PALC display. Channels (3) are situated between walls (2) of the channel plate (1). In this case, the channels have a substantially angular cross-section. However, channels having a rounded cross-section may alternatively be made. In this case, the channels are relatively deep. They may also be made relatively shallow. Two transparent closure plates (4, 5) enclosing an LCD liquid (6) are situated above the channel plate. In order to obtain an image, light is sent through the plate system. The double arrow indicates the direction of the light path. The channel plate is preferably made by blasting channels into a substantially flat plate. However, the channels may alternatively be obtained by means of another mechanical treatment.

Figure 2A:
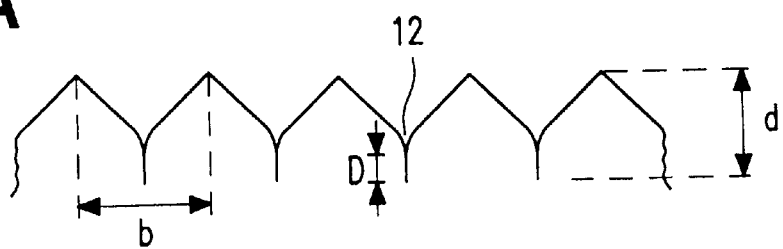
FIGS. 2A and 2B are diagrammatic cross-sections of a part of a glass surface after several steps of the method according to the invention.
Figure 2B:
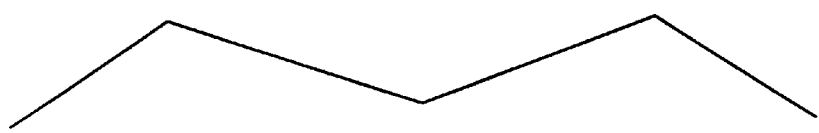

FIGS. 2A and 2B show a glass surface after a first (2A) and a second (2B) step of the process according to the invention. To simplify the Figure, the ratios between the distances d and b are not the same as in the real situation.

2A. After powder blasting, the glass has a rough surface. It is dull. The disturbed layer has tapering pits (12), for example, terminating in a crack having a typical maximum depth (D) which, dependent on the substrate and the method, varies between 2 and 50 micrometers, particularly between 5 and 20 micrometers. This typical depth of the cracks is dependent on the size of the powder particles and the blasting rate. For small cracks (of the order of 5–25 $\mu$m) the total depth (d) of the pits is generally twice as large as the depth (D) of the crack. The width (b) of the pits at the surface is generally much smaller than 1 micrometer. The width may often be of the order of, or smaller than, the wavelength of visible light. Due to the treatment, mechanical tensions often also occur in the glass. When light is sent through the plate, these causes result in diffusion and consequent depolarization of the light. When a plate for a PALC display is provided with ducts by means of powder blasting, the dullness of the glass and the occurring depolarization is a problem when the plate is used. It has a poorer transparency and there is a reduction of the maximum contrast and the maximum black. When the two polarization filters of the PALC display are crossed, light still passes through it.

2B. After post-etching, the disturbed layer, i.e. the layer in which the pits are present, is etched off to a depth of 10–40 micrometers. The maximum depth (D) of the crack is still substantially 5–20 micrometers because 10–40 micrometers is not only etched off the peaks but also off the dips. The total maximum depth (d) becomes smaller. After etching for a long period, the depth of the cracks (D) will also be smaller. However, since etching is isotropic, very sharp peaks are completely etched off and the pits become larger, even if a short etching treatment is performed. The peaks are less sharp. The microscopical roughness is then smaller so that the glass is less dull and there is less diffusion of light and thus less depolarization. These plates have a good quality. The quality can even be improved by etching for a longer period and removing, for example, 100 micrometers or more. When 200 micrometers is removed, the plate is almost completely clear. Then, also the macroscopical roughness, the maximum depth (d) of the pits has become very small. The time required for this treatment is, however, correspondingly longer so that the production time increases. If the etching treatment is continued too long, the surface of the larger pits then produced may be attacked, which leads again to smaller pits.

When a stronger etchant is used, the etching rate is larger and a shorter etching time is required to etch equally deep. When the etching time is shorter, deviations in etching depth with respect to a desired etching depth may increase. If the etching treatment lasts a few seconds too long or too short, the result will be a greater deviation in micrometers of the desired etching depth when etching in a strong etchant than when etching in a weaker etchant. Consequently, etching rates which are not too high are preferred for patterns for which small dimensional tolerances are required.

A number of measuring results of contrast tests will be given by way of example. In one experiment, a pattern of parallel ducts was powder-blasted in plates of barium-containing borosilicate glass by means of $Al_2O_3$ powder having a particle diameter of approximately 20–25 $\mu$m, at a rate of about 100 m/s. At such a high blasting rate, the glass will become very dull. Subsequently, the plates were post-etched under different circumstances. Finally, the maximum contrast was measured. This was done by placing the plate successively between parallel and crossed polarizers and by sending light through the assembly in both cases and by dividing the measured light currents (the largest light current was divided by the smallest light current). The light current is understood to mean the electric current (in microampere) through a photosensitive cell which was exposed to the transmitted light. If the maximum light current is referred to as Imax and the minimum light current is referred to as Imin, then the maximum contrast is given by Imax/Imin. Some results will be given below.

Measuring series 1:
* etchant: 25% $HBF_4$
* temperature: 40° C.
etching time (minutes) maximum contrast (dimensionless)

| | |
|---|---|
| 0 | 40 |
| 15 | 130 |
| 30 | 240 |
| 60 | 660 |
| 120 | >1000 |

Measuring series 2:
* etchant: 12.5% HF
* temperature: 25° C.
etching time (minutes) maximum contrast (dimensionless)

| | |
|---|---|
| 0 | 30 |
| 4 | 200 |
| 8 | 600 |
| 15 | >1000 |

Measuring series 3:
* etchant: 20% HF
* temperature: 25° C.

etching time (minutes) maximum contrast (dimensionless)

| 0 | 30 |
|---|---|
| 2 | 300 |
| 4 | 700 |
| 8 | >1000 |
| 15 | >1000 |

Measuring series 4:
* etchant: 50% HF
* temperature: 25° C.

etching time (minutes) maximum contrast (dimensionless)

| 0 | 35 |
|---|---|
| 0.5 | 900 |
| 1 | >1000 |
| 4 | >1000 |

Figure 3A:
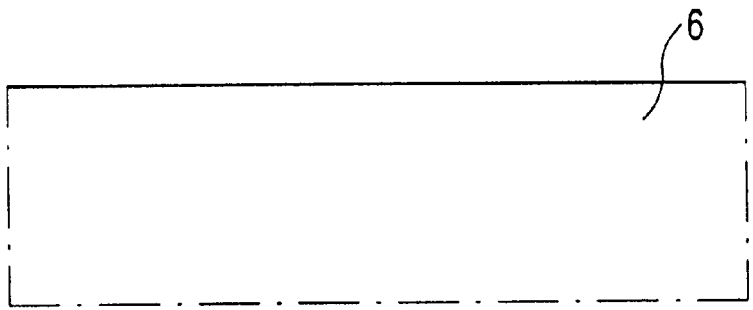
FIGS. 3A–3C are diagrammatic cross-sections of a part of a substrate during consecutive steps of an embodiment of the method according to the invention, in which no mask is used.
Figure 3B:
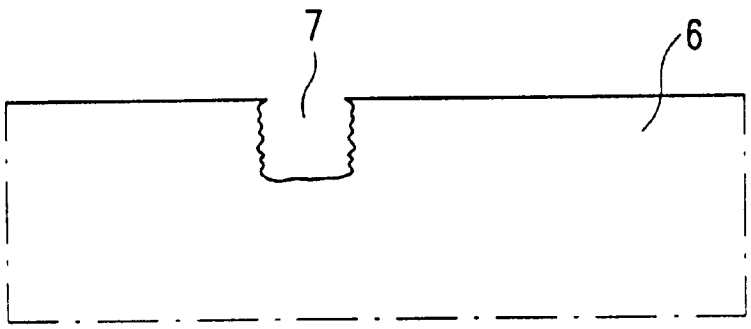

FIGS. 3A–3B consecutively show the substrate (6):

3A—at the start of the process

Figure 3C:
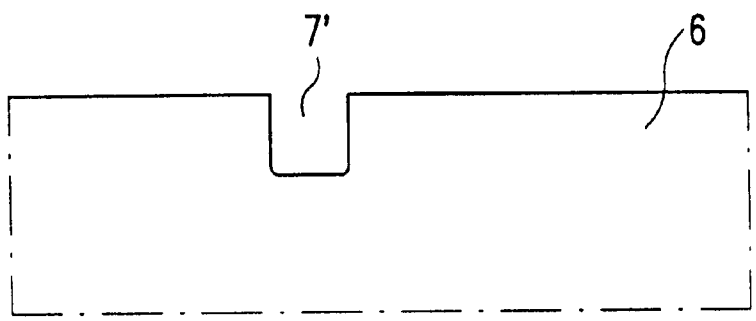
Figure 4A:
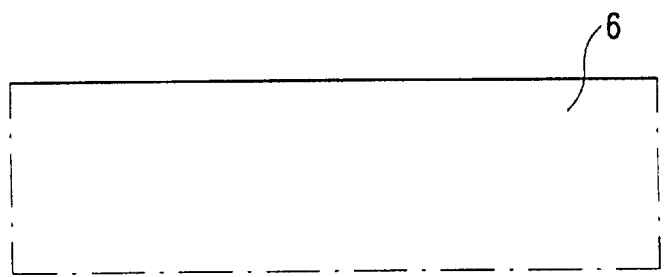
FIGS. 4A–4D diagrammatic cross-sections of a part of a substrate possibly provided with layers during consecutive steps in an embodiment of the method according to the invention, in which a mask is used.
Figure 4B:
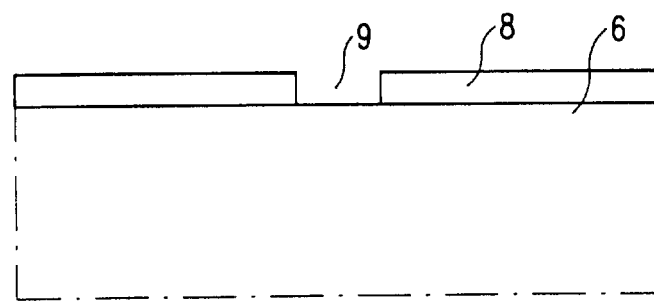
Figure 4C:
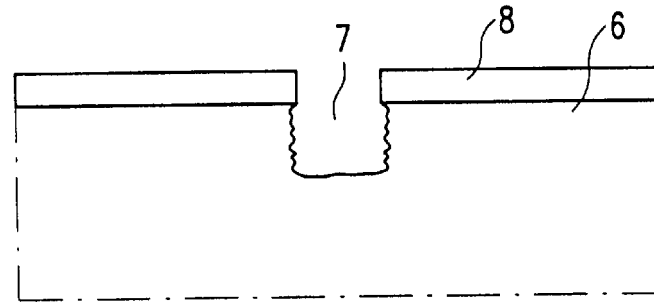
Figure 4D:
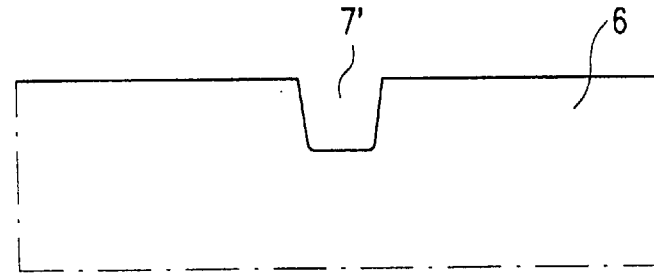
Figure 5A:
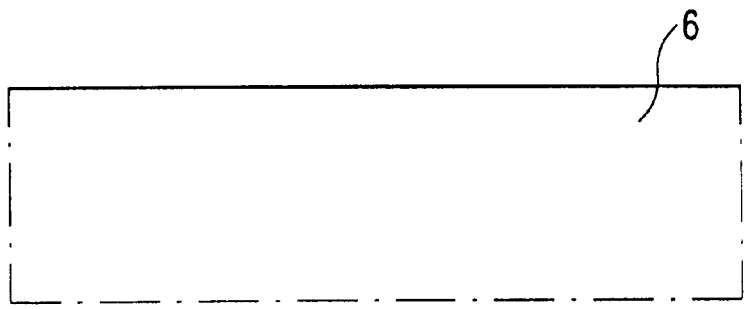
FIGS. 5A–5G diagrammatic cross-sections of a part of a substrate possibly provided with layers during consecutive steps in an embodiment of the method according to the invention, in which a protective layer and a mask are used.
Figure 5B:
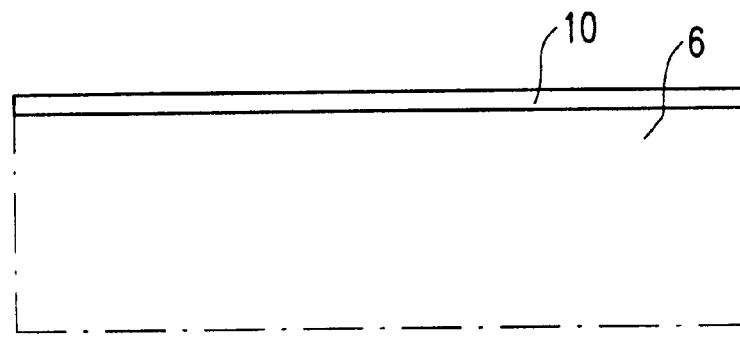
Figure 5C:
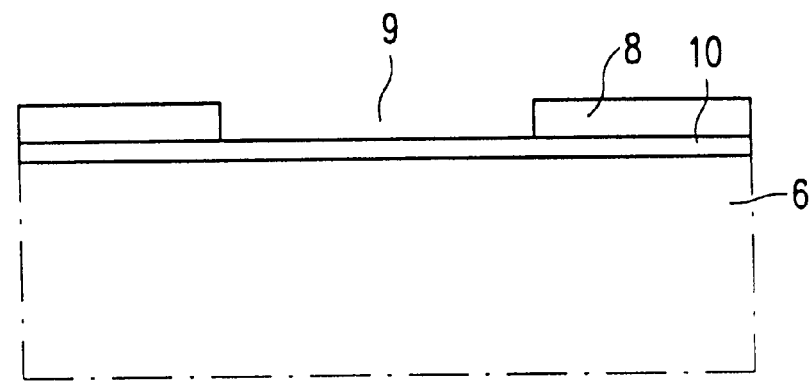
Figure 5D:
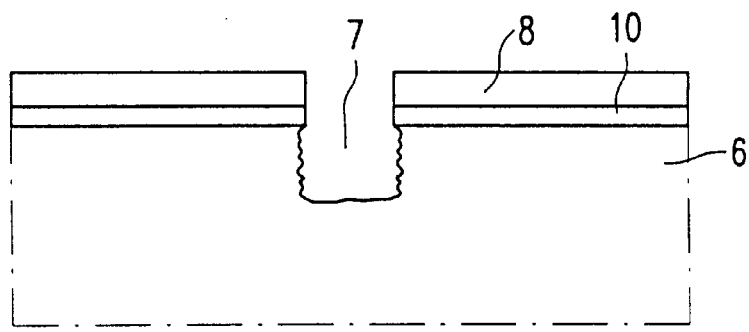
Figure 5E:
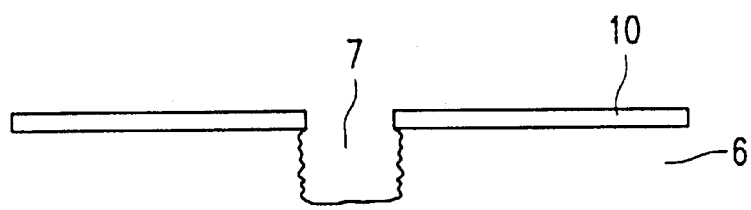
Figure 5F:
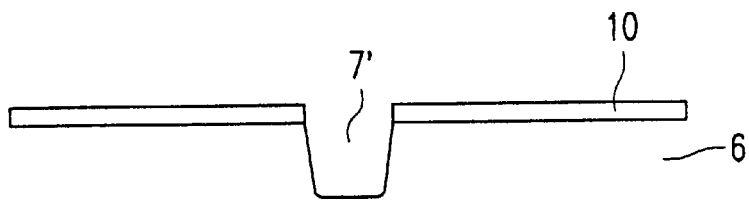
Figure 5G:
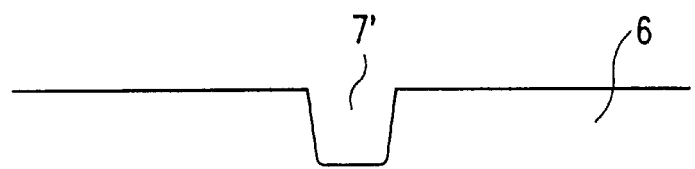
Figure 6A:
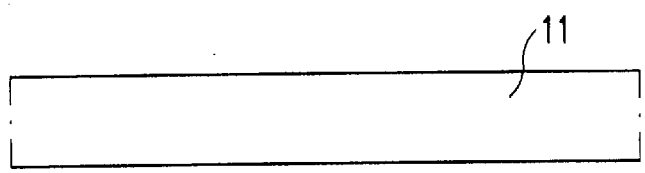
FIGS. 6A–6F diagrammatic cross-sections of a part of a plate provided with layers during consecutive steps in an embodiment of the method according to the invention, in which a mask and a protective layer are used.
Figure 6B:
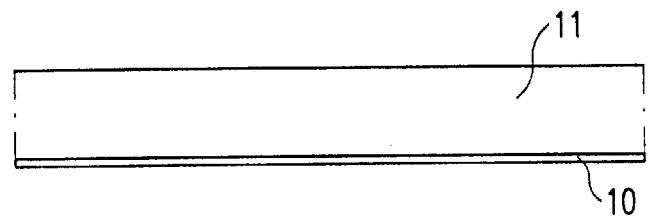
Figure 6C:
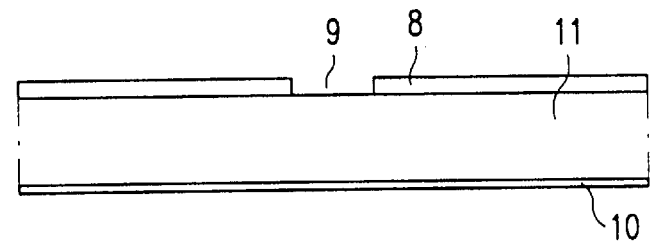
Figure 6D:
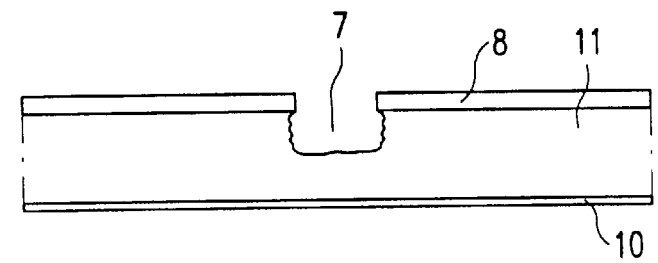
Figure 6E:
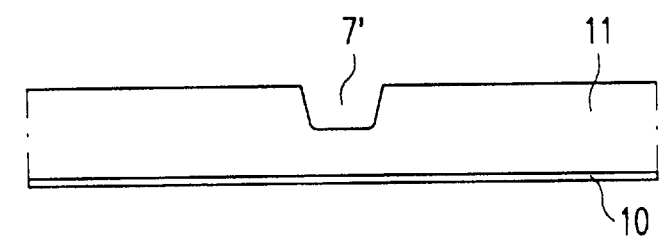
Figure 6F:
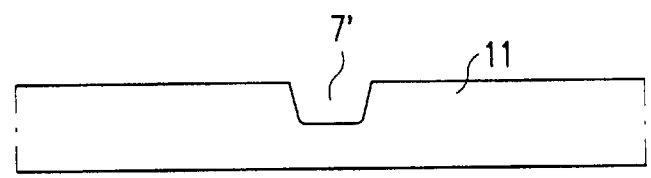

3B—after mechanical treatment, in which cavities (7) were made, one of which is shown in the Figure 3C—after wet-chemical etching, by which less rough cavities (7') were obtained from the cavities (7).

The mechanical treatment may be, for example, sawing, lapping, drilling, filing, grinding and particularly powder blasting. The substrate may be any material which can be mechanically post-processed and chemically etched. Different characteristic damage patterns and pit depths may be obtained in the different mechanical treatments. The etchant and the etching rate are adapted thereto. For deeper pits, for example, a longer etching time is preferably used. For narrow patterns, an etchant which is not too strong is preferably used for the etching treatment.

FIGS. 4A–4D consecutively show the substrate:

4A—at the start of the process, without a coating

4B—with a blasting mask (8) with apertures (9) provided on it

4C—after powder blasting, by which cavities (7) were obtained

4D—after wet-chemical etching, by which less rough cavities (7') were obtained from the cavities (7).

The blasting mask may be, for example a metal mask or a polyurethane mask.

FIGS. 5A–5G consecutively show the substrate (6):

5A—at the start of the process, without a coating

5B—with an etch-resistant protective coating (10) on it

5C—with a blasting mask (8)

5D—after powder blasting, at which cavities (7) were obtained

5E—after the blasting mask was removed

5F—after wet-chemical etching, by which less rough cavities (7') were obtained from the cavities (7)

5G—after removal of the protective coating.

The protective coating (10) protects the part of the surface coated thereby against the influence of the chemical etchant. It may be a metal coating, for example, a chromium coating. In this case, this coating can be removed by means of, for example, chromium etching when it is no longer necessary. The coating may alternatively consist of another type of material, for example, a polymer.

FIGS. 6A–6F consecutively show the plate:

6A—at the start of the process, without a coating

6B—with an etch-resistant protective coating (10) on the side which was not mechanically treated during this process 6C—with a blasting mask (8) provided with apertures (9) on it 6D—after powder blasting, by which cavities (7) were obtained 6E—after wet-chemical etching, by which less rough cavities (7') were obtained from the cavities (7)

6F—after removal of the protective coating.

The protective coating (10) may be, for example, a metal coating of chromium or another material such as a polyurethane. It is not always necessary to protect one side of the plate. In some cases, protection is not necessary. A plate can be post-etched by immersing it, for example, into an etching bath.

In summary, the invention relates to a method of providing a pattern of apertures and/or cavities in, for example, a glass channel plate of a plasma-addressed liquid crystal display, in which first a mechanical treatment is performed (for example, by means of powder blasting) and then a wet-chemical etching treatment is performed to render the walls of the channels microscopically less rough so that the optical disturbance is reduced and the glass becomes clearer again.

We claim:

1. A method of preparing a surface of a substrate, said method comprising providing a substrate having a surface with an etch resistant layer thereon, and a blast resistant mask on said etch resistant layer, said mask having apertures where said etch resistant layer is exposed, directing a jet of abrasive powder particles onto the mask, moving the jet relative to the mask so that said etch resistant mask is removed and cavities are formed in said substrate adjacent to said apertures, said cavities having walls rendered rough by the abrasive particles, removing the blast resistant mask, wet chemical etching the substrate with an etchant so that the walls of the cavities are rendered less rough, and removing the etch resistant layer.

2. A method as in claim 1 wherein said etchant comprises hydrogen fluoride.

3. A method as in claim 1 wherein said etchant comprises $HNO_3$.

4. A method as in claim 1 wherein the etch-resistant layer comprises chromium.

5. A method as in claim 1 wherein said wet chemical etching is performed by immersing said substrate in a bath of wet chemical etchant.

6. A method as in claim 5 wherein said substrate has a side opposite from said surface, which side is provided with an etch-resistant layer prior to immersing.

7. A method as in claim 1 wherein said substrate is glass and 2 to 200 μm is etched off the walls of the cavities.

8. A method as in claim 7 wherein 5–100 μm is etched off the walls.

9. A method as in claim 1 wherein said cavities are parallel channels.

* * * * *